United States Patent [19]
Unland et al.

[11] Patent Number: 4,815,970
[45] Date of Patent: Mar. 28, 1989

[54] APPARATUS FOR THE HEAT TREATMENT OF FINE-GRAINED MATERIAL

[75] Inventors: Georg Unland, Ennigerloh; Günter Driemeier, Lienen, both of Fed. Rep. of Germany

[73] Assignee: Krupp Polysius AG, Fed. Rep. of Germany

[21] Appl. No.: 145,596

[22] Filed: Jan. 19, 1988

[30] Foreign Application Priority Data

Jan. 23, 1987 [DE] Fed. Rep. of Germany ....... 3701967

[51] Int. Cl.⁴ ................................................ F27B 7/02
[52] U.S. Cl. ..................................... 432/106; 432/78; 432/14
[58] Field of Search ...................... 432/106, 14, 58, 78

[56] References Cited
U.S. PATENT DOCUMENTS

| | | | |
|---|---|---|---|
| 4,209,296 | 6/1980 | Deussner | 432/14 |
| 4,226,586 | 10/1980 | Brachthauser et al. | 432/106 |
| 4,257,766 | 3/1981 | Ritzmann et al. | 432/106 |
| 4,392,822 | 7/1983 | Brachthauser et al. | 432/106 |
| 4,402,667 | 9/1983 | Goldmann | 432/14 |
| 4,514,170 | 4/1985 | Kupper | 432/106 |
| 4,640,681 | 2/1987 | Steinbiss et al. | 432/106 |

Primary Examiner—Henry C. Yuen
Attorney, Agent, or Firm—Learman & McCulloch

[57] ABSTRACT

The invention relates to apparatus for the heat treatment of fine-grained material having a rotary drum furnace, a preheater, a cooler, and a combustion chamber for precalcination of the material. Exhaust air from the cooler is delivered on the one hand to the combustion chamber and on the other hand via two pipes directly to the furnace exhaust gas pipe, and connections for the supply of fuel and preheated material are provided in these latter pipes shortly upstream from the point at which they open into the furnace exhaust gas pipe.

14 Claims, 5 Drawing Sheets

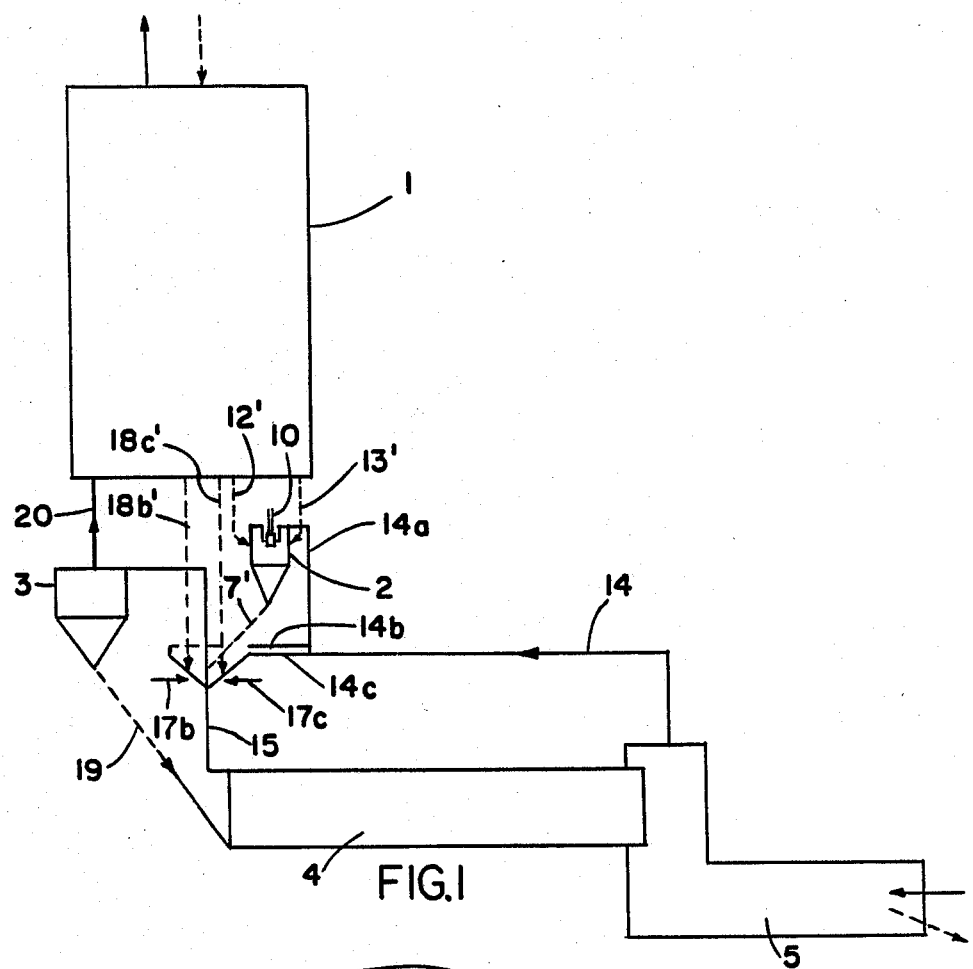
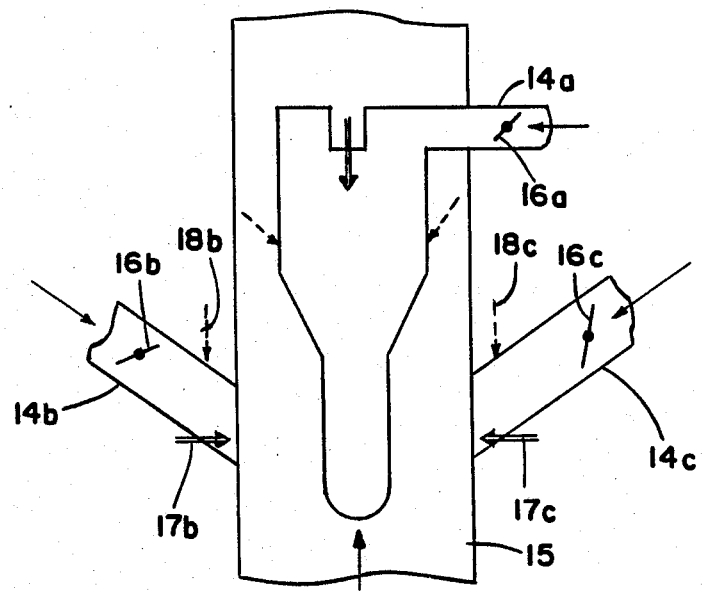

APPARATUS FOR THE HEAT TREATMENT OF FINE-GRAINED MATERIAL

The invention relates to apparatus for the heat treatment of fine-grained material, such as cement raw material.

Apparatus according to the preamble to claim 1 are known for example from DE-A- Nos. 22 48 030 and 24 51 197. They facilitate precalcination (deacidification of the preheated material) in a combustion chamber supplied with exhaust air from a cooler (tertiary air), and the material which has already been greatly heated in this way and largely deacidified is then introduced into the furnace exhaust gas pipe and here undergoes further deacidification by means of the hot furnace exhaust gases and possibly additional fuel before it passes into the rotary drum furnace after separation in the lowest cyclone of the preheater.

The object of the invention is to improve such apparatus and enable it to be adapted well to changing operating conditions and to different substances and raw materials.

In the apparatus according to the invention material and fuel can be introduced as required either only into the combustion chamber or additionally also into the two tertiary air pipes which open into the furnace exhaust gas pipe, and the division of the material is independent of the fuel distribution. In this way it is possible to adapt the apparatus in an ideal manner to different operation conditions, raw materials and fuels. The substantially improved start of combustion is also advantageous.

In the drawings:

FIG. 1 shows a schematic representation of a first embodiment of the apparatus according to the invention.

FIGS. 2 and 3 show partial representations of the elements of the apparatus according to FIG. 1 which are essential to the invention.

Figure 3:
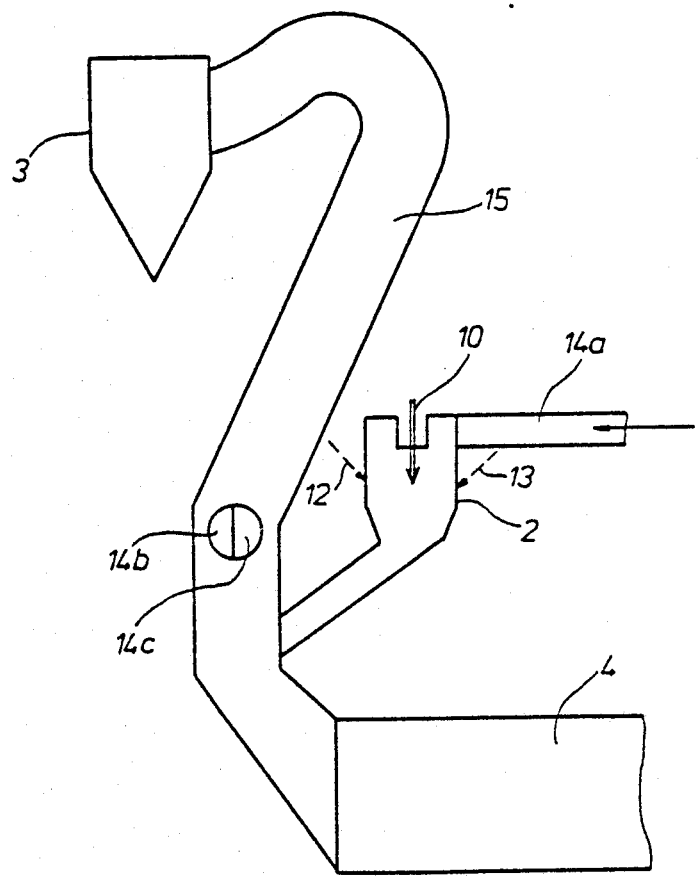

The apparatus illustrated in FIGS. 1 to 4 for the heat treatment of fine-grained material, particularly cement raw material, contains a multi-stage preheater 1 which is only shown quite schematically and serves to preheat the material. This preheater 1 preferably consists of a plurality of cyclones which are connected to one another by their gas and material pipes and in which the material is preheated in stages by the hot exhaust gases from the combustion and precalcination zone which is described below.

The apparatus according to FIG. 1 also contains a combustion chamber 2, a cyclone 3, a rotary drum furnace 4 and a cooler 5.

Figure 4:
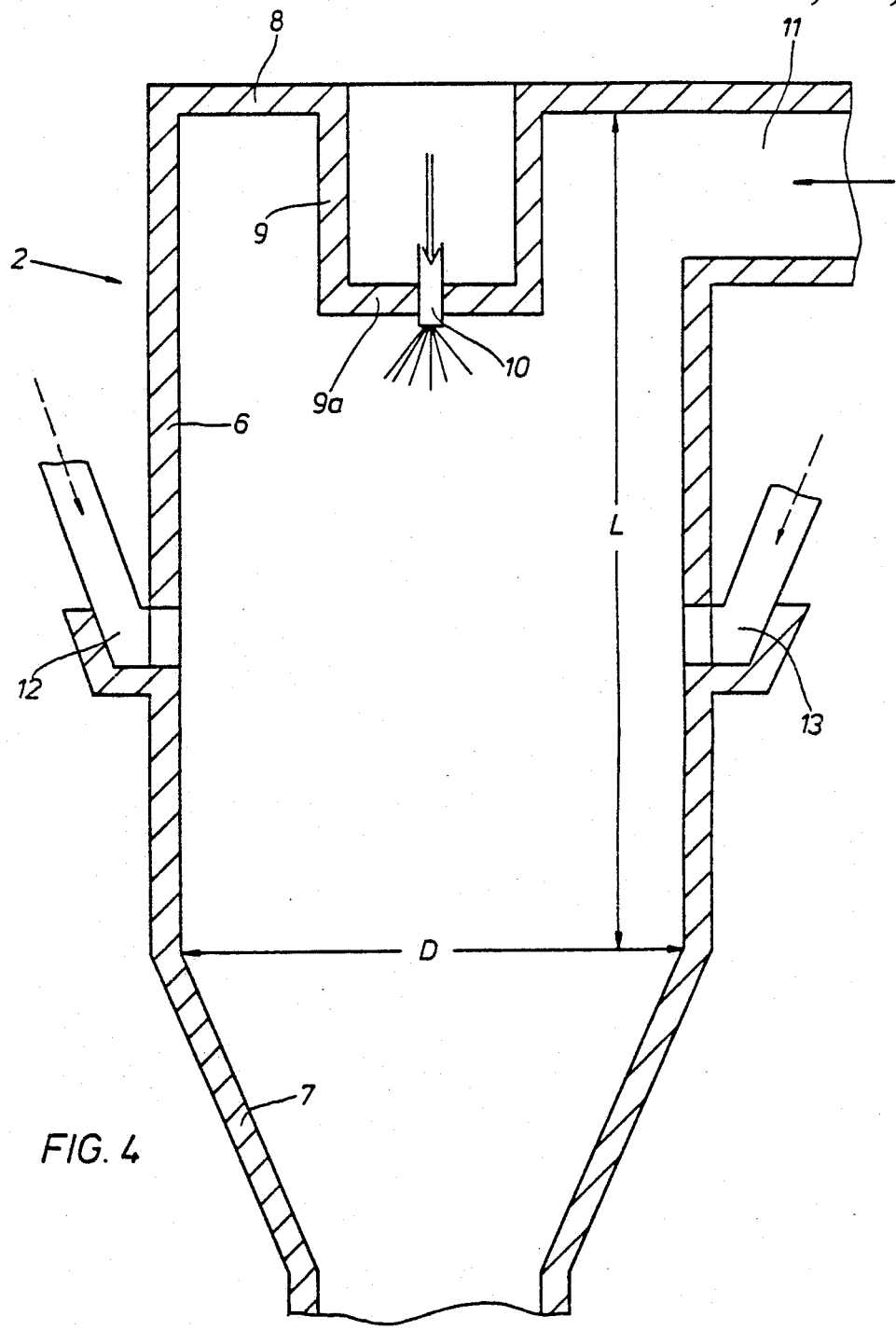
FIG. 4 shows a section through the combustion chamber according to FIGS. 1 to 3.

The combustion chamber 2 which is shown in detail in FIG. 4 contains an upper region 6 of cylindrical construction and a lower region constructed as a hopper 7. The cover 8 of the combustion chamber is provided with a downwardly-directed central recess 9, the base 9a of which is provided with a fuel supply 10.

In addition the combustion chamber 2 has a tangential combustion air supply 11 in the upper region at the level of the central recess 9. The base 9a of the central recess 9 is somewhat lower than the the underside of the tangential combustion air supply 11.

In the central part of the level of the upper cylindrical region 6 of the combustion chamber two diametrically opposed material supplies 12, 13 (for example in the form of dispersion boxes) are provided in the peripheral wall of the combustion chamber.

The ratio of the length L to the diameter D of the upper cylindrical region 6 of the combustion chamber is advantageously between 2 and 2.5.

A pipe or duct 14 which is connected to the cooler 5 and conducts exhaust air from the cooler (tertiary air) branches into one pipe 14a which is connected to the combustion chamber 2 and two branch pipes 14b, 14c which are connected directly to the furnace exhaust gas pipe 15 connecting the rotary drum furnace to the cyclone 3.

The pipe 14a opens via the aforementioned combustion air supply 11 into the combustion chamber 2, whilst the branch pipes 14b and 14c—as can be seen from FIG. 2—open with a downwards inclination into the furnace exhaust gas pipe 15. Valves 16a, 16b, 16c are provided in the said three pipes 14a, 14b and 14c to adjust the air stream introduced into the combustion chamber 2 and into the furnace exhaust gas pipe 15.

The hopper 7 of the combustion chamber 2 is connected via a pipe 7' to the furnace exhaust gas pipe 15, and the point at which this pipe 7' opens into the furnace exhaust gas pipe 15 can lie at the same level as, above or below the point at which the pipes 14b and 14c open.

Shortly before the point at which they open into the furnace exhaust gas pipe 15 the pipes 14b and 14c are provided with connections 17b, 17c for the supply of fuel and with connections 18b, 18c for the supply of preheated material. The material pipes leading from the preheater 1 to the connections 18b, 18c are designated schematically by 18'b and 18'c respectively in FIG. 1. In a corresponding manner the pipes leading to the material supplies 12, 13 of the combustion chamber 2 are designated by 12' and 13' respectively.

The apparatus advantageously contains arrangements (not illustrated in the drawings) to enable the material streams introduced into the combustion chamber 2 and directly into the furnace exhaust gas pipe 15 to be adjusted.

The illustrated apparatus functions as follows:

The fine-grained material is preheated in the preheater 1 with the hot exhaust gases from the rotary drum furnace 4 and the combustion chamber 2. An adjustable proportion of the preheated material passes from the preheater 1 via the pipes 12', 13' into the combustion chamber 2 where it is further heated and greatly deacidified by the additional fuel supplied at 10. The central recess 9 provided in the cover of the combustion chamber 2 serves for spin stabilisation of the combustion air which is supplied tangentially. The fuel is introduced centrally into the combustion chamber 2 via the supply pipe 10 and ignites in pure air. At approximately half the height of the cylindrical upper region 6 of the combustion chamber 2 the material passes via the supply pipes 12, 13 into the combustion chamber 2. At the same time the temperature in the combustion chamber is controlled.

The material which is greatly deacidified in the combustion chamber 2 then passes via the pipe 7' into the furnace exhaust gas pipe 15 and is there mixed together with the material streams which are introduced via the pipes 18'b, 18'c into the tertiary air pipes 14b, 14c which open directly into the furnace exhaust gas pipe 15. For the deacidification of these material streams further fuel is introduced via the connections 17b, 17c into the pipes 14b, 14c (immediately before the points at which they open into the furnace exhaust gas pipe 15).

The material separated off in the cyclone 3 is then delivered via a pipe 19 to the rotary drum furnace 4 where it is burnt to clinker and is then cooled in the cooler 5. The gas stream which is free of material is delivered via a pipe 20 to the further stages of the preheater 1.

Figure 5:
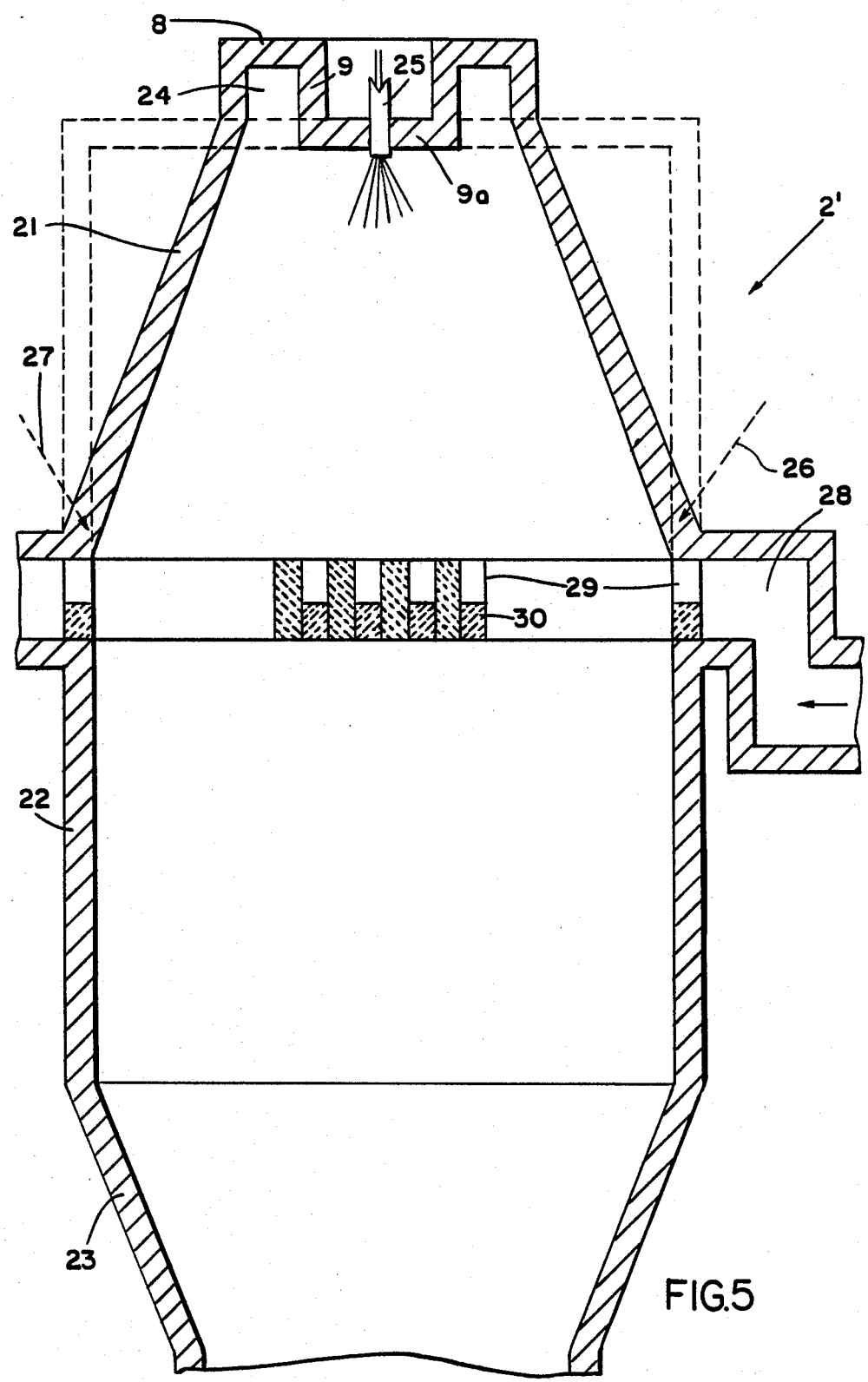
FIG. 5 shows a section through a further embodiment of a combustion chamber.

FIG. 5 shows a variant of a combustion chamber 2'. It contains an inlet part 21 which widens conically downwards, a cylindrical central part 22 and an outlet part 23 constructed as a funnel-shaped hopper. A connection constructed as an annular channel 24 for the supply of combustion air is provided in the upper region of the inlet part 21, as well as a central connection 25 arranged on the end for the supply of fuel. As in the embodiment according to FIG. 4, in this variant according to FIG. 5 the cover 8 of the combustion chamber 26 is provided with a recess 9 which has the connection for the fuel supply arranged in its base 9a.

Connections 26, 27 (which are only indicated schematically) for the supply of material are provided in the lower region of the inlet part 21.

In the upper region of the central part 22 of the combustion chamber further connections for the supply of combustion air are provided and in the illustrated embodiment take the form of an annular channel 28 which is connected via holes 29 in the refractory lining 30 to the interior of the combustion chamber 2'. Thus in this embodiment some tertiary air is introduced into the combustion chamber at the end via the inlet part 21 and some via the annular channel 28 at the beginning of the cylindrical central part 22.

Figure 6:
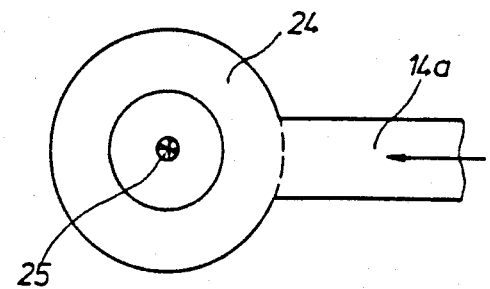
FIGS. 6 to 8 show schematic representations to explain the tertiary air supply to the end of the combustion chamber according to FIG. 5.
Figure 7:
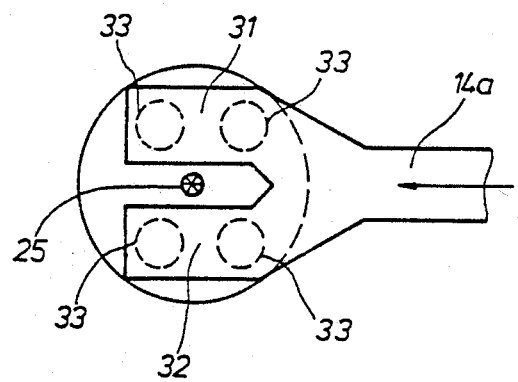
Figure 8:
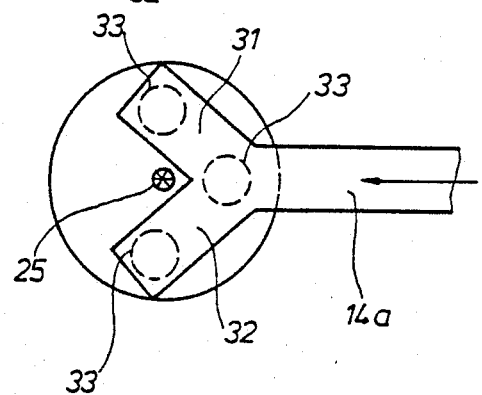

FIGS. 6 to 8 show variants of the tertiary air supply at the end of the upper region of the inlet part 21. According to FIG. 6 an annular channel 24 is connected to the tertiary air pipe 14a. In the variant according to FIG. 7 two distributor boxes 31, 32 with holes 33 are provided instead of the annular channel. A similar arrangement with two distributor boxes 31, 32 and three holes 33 is shown in FIG. 8.

The invention will now be explained with the aid of the following examples.

1. If for reasons of space only a small combustion chamber is to be installed during the rebuilding of an existing precalcination plant, then only a proportion of the fuel for the precalcination is put into the combustion chamber. The other proportion of the fuel is delivered via the connections 17b, 17c to the pipes 14b, 14c. The material coming from the preheater 1 is either introduced in its entirety into the combustion chamber 2 or it is divided between the combustion chamber 2 and the pipes 14b, 14c.

2. If the object is a reduction of the nitric oxide emission, then the following construction is chosen:

The total fuel for the precalcination and all of the preheated material are introduced into the combustion chamber 2. The connection of the pipes 14b, 14c to the furnace exhaust gas pipe 15 is offset upwards in the gas direction, i.e. higher than the connection of the pipe 7'. In this way a zone with reducing gas atmosphere is produced in the furnace exhaust gas pipe 15 between the connection of the pipe 7' (combustion chamber connection) and the connection of the pipes 14b, 14c, which favours the reduction of the nitric oxides from the furnace exhaust gases.

What is claimed is:

1. In apparatus for heat treating fine-grained material, said apparatus having:
    (a) a preheater to which such material is supplied,
    (b) a combustion chamber in communication with said preheater for receiving preheated material therefrom and precalcining it,
    (c) means for supplying said combustion chamber with fuel,
    (d) means for delivering precalcined material to a furnace for final burning of the precalcined material,
    (e) a cooler in communication with said furnace for receiving burnt material therefrom,
    (f) duct means for supplying said combustion chamber with combustion air from said cooler,
    (g) a furnace exhaust pipe through which hot exhaust gases may flow to said preheater, and
    (h) a combustion chamber exhaust pipe in communication with the furnace exhaust pipe,
  the improvement wherein:
    (i) said duct means has a first branch communicating with said combustion chamber and second and third branches communicating directly with the furnace exhaust pipe, and
    (j) material supply means communicating with said preheater and each of said second and third branches for supplying said branches with material from said preheater, said material supply means communicating with the respective second and third branches upstream from the connection of the latter to said furnace exhaust pipe.

2. Apparatus according to claim 1 wherein the combustion chamber exhaust pipe and said second and third branches communicate with the furnace exhaust pipe at different peripheral points on said furnace exhaust pipe.

3. Apparatus according to claim 1 wherein the combustion chamber exhaust pipe and said second and third branches communicate with the furnace exhaust pipe at different heights.

4. Apparatus according to claim 1 wherein the combustion chamber exhaust pipe and said second and third branches communicate with the furnace exhaust pipe at different heights and at different peripheral points on said furnace exhaust pipe.

5. Apparatus according to claim 1 including means for adjusting the air supplied to the combustion chamber.

6. Apparatus according to claim 1 including means for adjusting the air supplied to said furnace exhaust pipe via said second and third branches.

7. Apparatus according to claim 1 including means for adjusting the supply of material to said branches.

8. Apparatus according to claim 1 wherein said combustion chamber has an upper cylindrical region and a lower funnel shaped region.

9. Apparatus according to claim 8 wherein said combustion chamber has a downwardly-directed central recess having a base supporting a fuel supply.

10. Apparatus according to claim 9 wherein said duct means communicates with said combustion chamber tangentially thereof.

11. Apparatus according to claim 8 wherein said combustion chamber communicates with said preheater at a level substantially centrally of the upper region of the combustion chamber.

13. Apparatus according to claim 1 wherein said preheated material is supplied to said combustion chamber via two supply pipes diametrically opposite one another.

13. Apparatus according to claim 1 wherein said combustion chamber has a cylindrical region having a length to diameter ratio of between 2 and 2.5.

14. Apparatus according to claim 1 wherein said combustion chamber has an upper inlet part which widens conically downwards, a cylindrical central part, and a lower, funnel shaped outlet part.

* * * * *